United States Patent
Beattie et al.

(10) Patent No.: US 6,431,339 B1
(45) Date of Patent: *Aug. 13, 2002

(54) TRANSMISSION SHIFTER WITH LEVER-POSITION LOCKING DEVICE

(75) Inventors: Dale A. Beattie, Muskegon; Robert D. Brock, Grand Haven; Robert A. DeJonge, West Olive, all of MI (US)

(73) Assignee: Grand Haven Stamped Products, division of JSJ Corporation, Grand Haven, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/976,619

(22) Filed: Oct. 12, 2001

Related U.S. Application Data

(63) Continuation of application No. 09/626,842, filed on Jul. 27, 2000, now Pat. No. 6,325,196.
(60) Provisional application No. 60/146,257, filed on Jul. 29, 1999.

(51) Int. Cl.$^7$ ................................................ B60K 41/26
(52) U.S. Cl. ............................ 192/220.4; 74/473.18; 74/473.25
(58) Field of Search ...................... 192/220.2, 220.3, 192/220.4, 220.7; 74/473.18, 473.25, 541, 540, 529

(56) References Cited

U.S. PATENT DOCUMENTS

| | | | | |
|---|---|---|---|---|
| 3,169,616 A | * | 2/1965 | Hunsaker et al. | ........ 192/220.2 |
| 4,326,432 A | | 4/1982 | Miller | |
| 4,966,262 A | * | 10/1990 | Mieczkowski | .......... 192/220.2 |
| 5,211,271 A | * | 5/1993 | Osborn et al. | ........... 192/220.3 |
| 5,415,056 A | | 5/1995 | Tabata et al. | |
| 5,718,312 A | | 2/1998 | Osborn et al. | |
| RE35,772 E | * | 4/1998 | Ratke et al. | ............. 192/220.2 |
| 5,791,197 A | | 8/1998 | Rempinski et al. | |
| 5,845,535 A | | 12/1998 | Wakabayashi et al. | |
| 5,899,115 A | | 5/1999 | Kataumi et al. | |
| 5,927,150 A | | 7/1999 | Hirano et al. | |
| 6,018,294 A | * | 1/2000 | Vogel et al. | ................. 340/456 |
| 6,148,686 A | | 11/2000 | Kataumi | |
| 6,182,527 B1 | * | 2/2001 | Sander | ........................ 74/529 |

OTHER PUBLICATIONS

Discloses a prior art shifter manufactured by Audi Corporation more than one year prior to filing the present application.

* cited by examiner

*Primary Examiner*—Rodney H. Bonck
(74) *Attorney, Agent, or Firm*—Price Heneveld Cooper Dewitt & Litton

(57) ABSTRACT

A shifter is provided for shifting a vehicle transmission between a plurality of different gear positions. The shifter includes a base, and a shift lever pivoted to the base for movement between shift lever positions corresponding to the different gear positions. The shift lever includes a flange with an arcuate slot with a first enlarged pocket corresponding to a first one of the different gear positions and a second enlarged pocket corresponding to a second one of the different gear positions. An electromechanical device is provided having an extendable pin that is configured to engage the first enlarged pocket and lock the shift lever in the first one gear position until first predetermined vehicle conditions are met, and further that is configured to engage the second enlarged pocket and lock the shift lever in the second one gear position until second predetermined vehicle conditions are met.

7 Claims, 13 Drawing Sheets

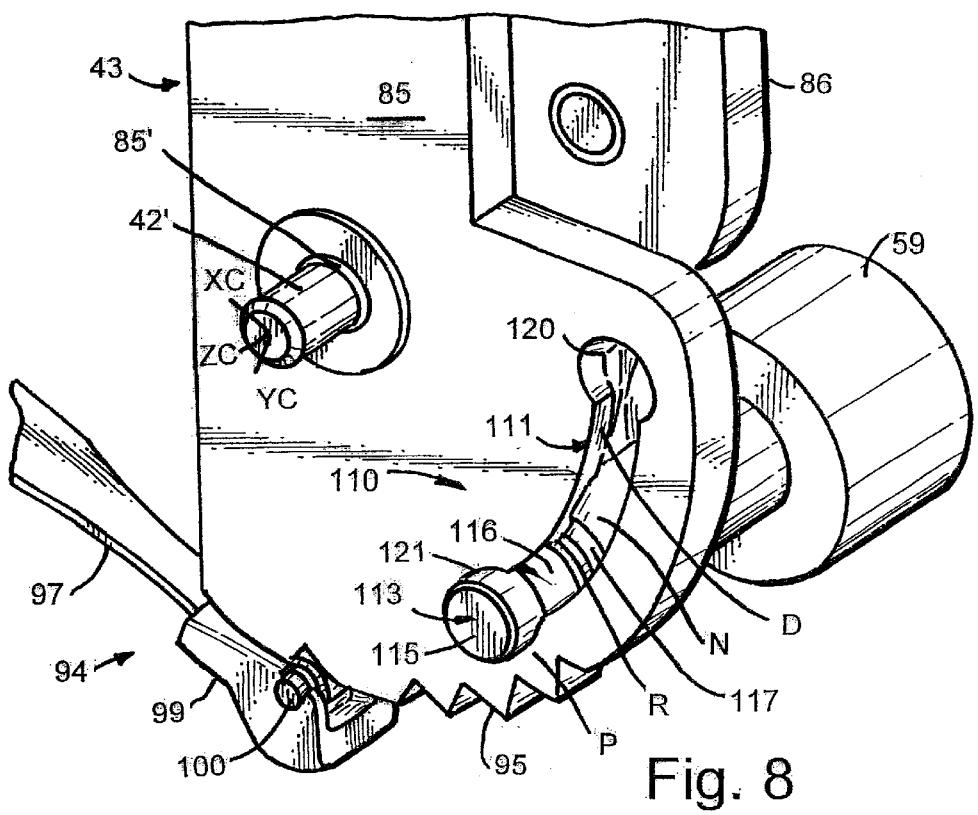
Fig. 8
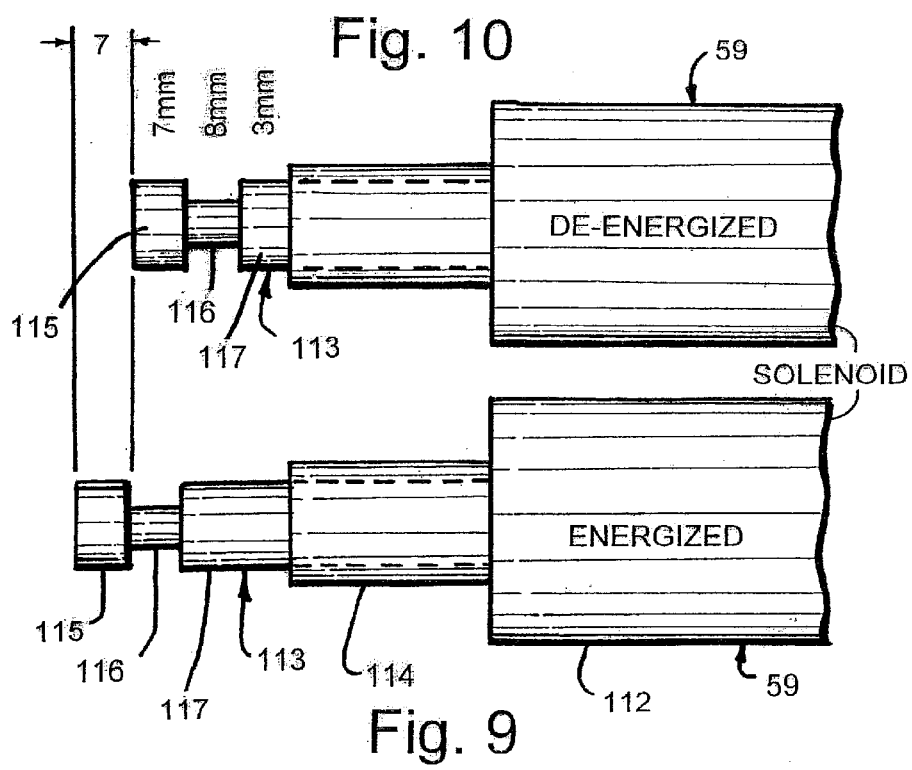
Fig. 10
Fig. 9

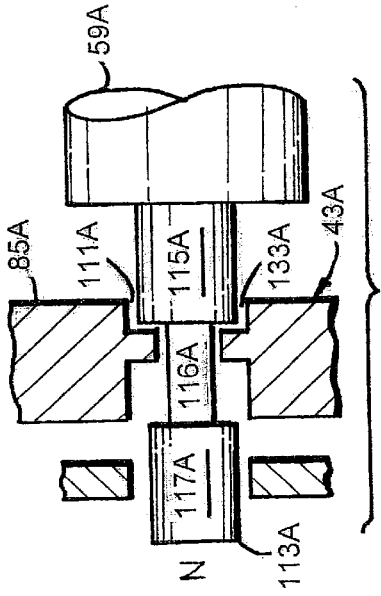
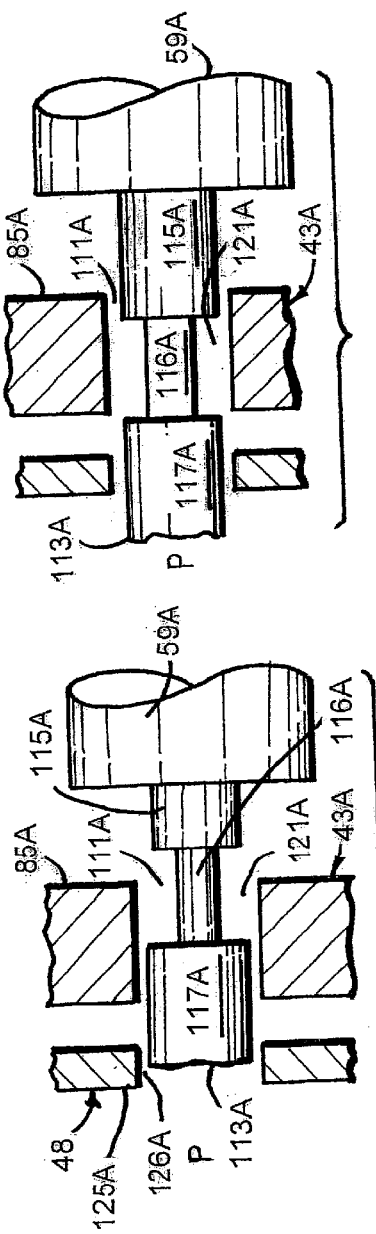
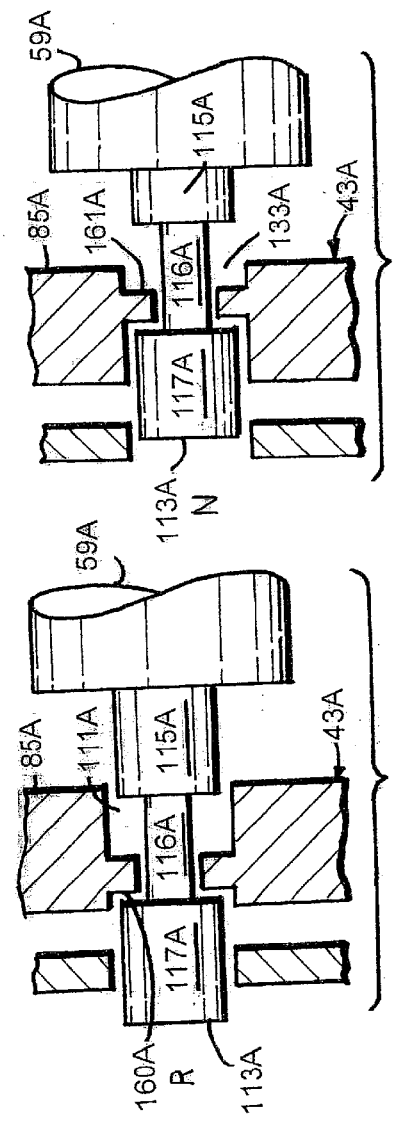

TRANSMISSION SHIFTER WITH LEVER-POSITION LOCKING DEVICE

CROSS REFERENCE TO RELATED APPLICATION

The present application claims benefit under 35 USC §119(e) of provisional application serial No. 60/146,257, filed Jul. 29, 1999, entitled SHIFTER WITH PARK LOCK AND NEUTRAL LOCK DEVICE, the entire contents of which are incorporated herein by reference, and further this application is a continuation of application Ser. No. 09/626, 842, filed Jul. 27, 2000, entitled SHIFTER WITH PARK LOCK AND NEUTRAL LOCK DEVICE U.S. Pat. No. 6,325,196, issued Dec. 4, 2001.

BACKGROUND OF THE INVENTION

The present invention relates to shifters for transmissions of passenger vehicles, and more particularly relates to shifters having devices to control movement of the shift lever between gear positions.

Passenger vehicles in the United States have the driver's seat positioned in a front left side of the passenger compartment. The transmission shifter is typically positioned between the front vehicle seats for operation with the driver's right hand. However, passenger vehicles in many other countries, such as Japan, position the driver on the front right side of the passenger compartment. The shifter is often still positioned between the vehicle seats, but the shifter is located on a left side of the driver for left-handed operation. This can cause numerous problems in factories created to manufacture both left-hand drive and right-hand drive vehicles. For example, twice as many part numbers are created, one set for right-hand driven vehicles and one set for left-hand driven vehicles. Inventories increase dramatically because there are twice as many parts that must be inventoried. Further, twice as many tools and fixtures must be created and lower volumes of each parts are used, thus reducing efficiencies of manufacture while adding to storage costs. Also, there are significant advantages to postponing the decision as to which type vehicle (i.e., left-hand or right-hand drive) will be produced to as late in the assembly process. Further, there are advantages to being able to switch a vehicle from left-hand to right-hand style and vice versa with as few parts as possible. Thus, a shifter that uses a maximum of common parts is desired.

Modern vehicle shifters also have another problem. Modern vehicle shifters have park lock devices that lock their shift levers in the park gear position until predetermined vehicle conditions are met. For example, federal regulations require that a vehicle's brake pedal be depressed and an ignition key be turned on before a shift lever can be moved from its park gear position to a drive gear position. The reason for this is so that the vehicle is operational but braked before an operator shifts into gear. Also, modern vehicle shifters are now being specified or proposed with neutral lock devices and/or reverse lockout devices to prevent them from being accidentally shifted from drive gear position or neutral gear position into reverse gear position while the vehicle is moving forward at too great of speed. Some shifter systems are proposed that are constructed to prevent a transmission from shifting from drive gear position into reverse gear position while the vehicle is going too fast, but they typically do not prevent the shift lever itself from being accidentally moved into the reverse gear position. As a result, when the vehicle does slow down and the transmission is "unlocked," the transmission drops with a sharp jolt into the reverse gear position. This can result in a potentially unsafe condition since the vehicle suddenly and unexpectedly operate. It is desirable to prevent the shift lever itself from being accidentally shifted from the drive gear position into the reverse gear position.

Several ways are known to provide a park lock. Often they use a solenoid to extend a pin into a pawl-engaging cam in a way that prevents a pawl from exiting a park notch. The solenoid is connected to a control circuit with a controller programmed to require that predetermined vehicle conditions be met before the solenoid is energized. As a result, a shift lever cannot be moved out of its park gear position until the predetermined vehicle conditions are met. For example, the predetermined vehicle conditions may include a requirement that the brake pedal be depressed.

Present proposals for neutral lock devices include a second solenoid not unlike the park lock solenoid. This second solenoid has an extendable pin that can be extended to engage a pawl-engaging cam in a way that prevents the pawl from moving from neutral toward the reverse or drive gear position unless predetermined vehicle conditions are met. A problem is that solenoids are expensive, and including two solenoids in a shifter results in a relatively expensive shifter assembly.

Some park lock devices utilize a cable connected to a vehicle component, such as to a brake pedal or actuator. The cable is connected to the shifter in a manner preventing shifting from park gear position until predetermined vehicle conditions, such as the ignition key being on, are met. However, cables are also expensive to purchase. Further, the cables must be routed in the vehicle and connected at each end, making them expensive to install. Further, it is not at all clear how such a construction could be made to provide a neutral lock function.

Accordingly, a shifter solving the aforementioned problems and having the aforementioned advantages is desired.

SUMMARY OF THE PRESENT INVENTION

In one aspect of the present invention, a shifter is provided for shifting a transmission between different gear positions including a plurality of different gear positions. The shifter includes a base, and a shift lever pivoted to the base for movement between shift lever positions corresponding to the different gear positions. The shift lever includes a flange with an elongated slot with a first enlarged pocket corresponding to a first one of the different gear positions and a second enlarged pocket corresponding to a second one of the different gear positions. A control circuit is provided that is adapted to sense at least one vehicle condition. An electromechanical device is provided having an extendable pin that is continuously positioned in the slot in all positions of the shift lever. The extendable pin is configured to engage the first enlarged pocket and lock the shift lever in the first one gear position until first predetermined vehicle conditions are met, and further is configured to engage the second enlarged pocket and lock the shift lever in the second one gear position until second predetermined vehicle conditions are met.

In another aspect of the present invention, a shifter includes a base, and a shift lever pivoted to the base for movement between shift lever positions corresponding to the different gear positions. The shift lever includes a flange with an elongated slot with an enlarged neutral pocket. A control circuit is provided that is adapted to sense at least one vehicle condition. An electromechanical device has an extendable pin that is continuously positioned in the slot in all positions of the shift lever. The extendable pin is configured to engage the neutral pocket and lock the shift lever in the neutral shift lever position until first predetermined vehicle conditions are met.

In another aspect of the present invention, a shifter includes a base, and a shift lever pivoted to the base for movement between shift lever positions corresponding to the different gear positions, the shift lever including a flange with a park-defining feature and a neutral-defining feature. A control circuit is provided that is adapted to sense at least one vehicle condition, and an electromechanical device is provided having an extendable pin that is configured to engage the neutral-defining feature and lock the shift lever in the neutral shift lever position until first predetermined vehicle conditions are met. The extendable pin is further configured to engage the park-defining feature and lock the shift lever in the park shift lever position until second predetermined vehicle conditions are met.

These and other features, objects, and advantages of the present invention will become apparent to a person of ordinary skill upon reading the following description and claims together with reference to the accompanying drawings.

BRIEF DESCRIPTION OF DRAWINGS

FIG. 8 is an enlarged fragmentary perspective view of an assembly of the solenoid and the locking member shown in FIG. 7;

FIGS. 9 and 10 are schematic views of the solenoid of FIG. 7, showing the solenoid in a retracted position and in an extended position, respectively;

FIGS. 24–28 are schematic side cross-sectional views of the extendable pin of FIG. 21, the FIGS. 24–28 showing various positions of the shift lever and the extendable pin as described below.

DETAILED DESCRIPTION OF PREFERRED EMBODIMENT

Figure 1:
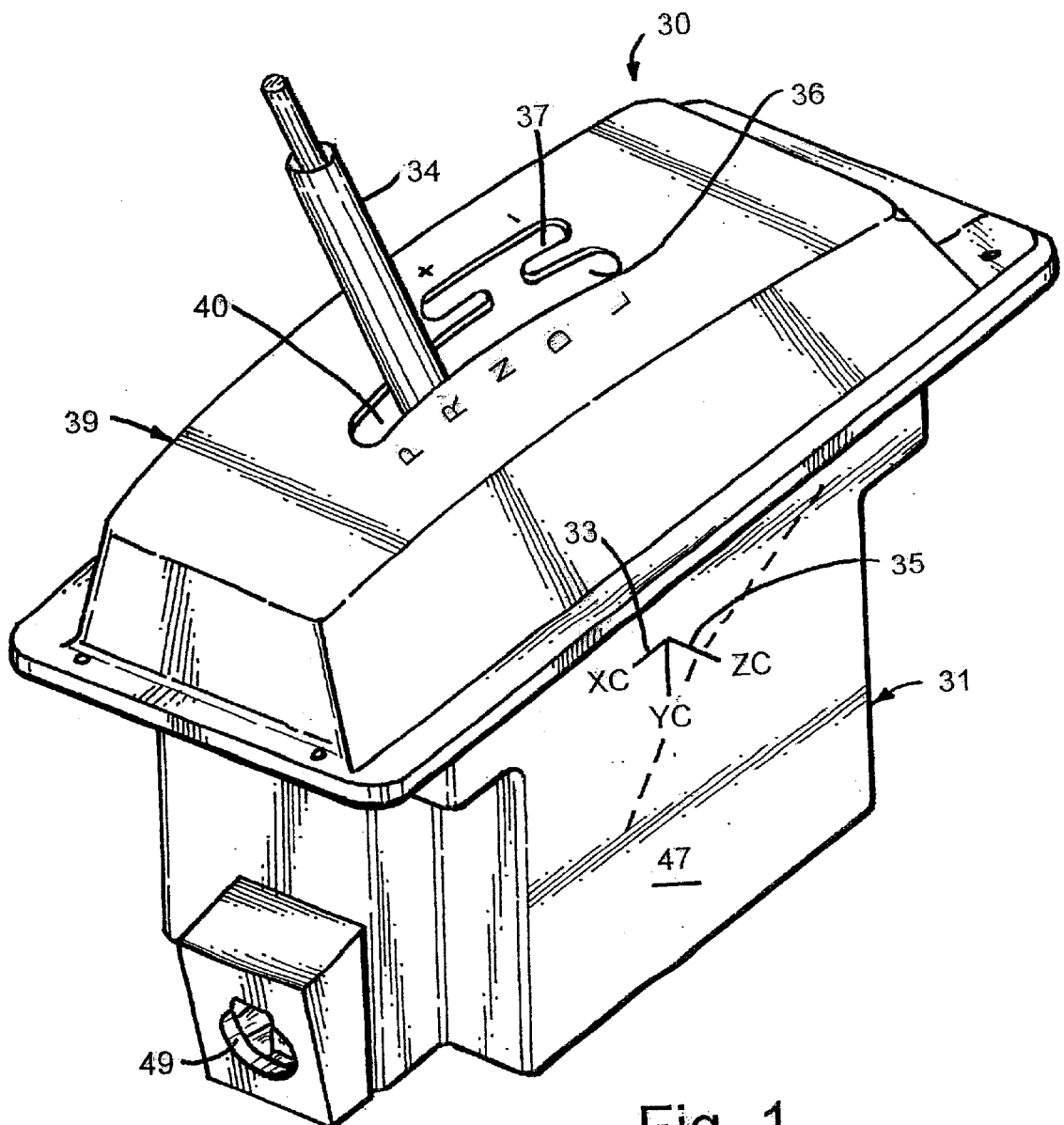
FIGS. 1 and 2 are perspective views of shifters constructed for right-hand driven vehicles and left-hand driven vehicles, respectively.

A shifter 30 (FIG. 1) embodying the present invention is provided for shifting a vehicle transmission. The shifter 30 has a shift lever 34 that is movable along a first path 36 in an automatic shifting mode that includes the automatically shifting gear positions park "P", reverse "R", neutral "N", drive "D", and low drive "L" (PRNDL), and that is movable along parallel second or third shift paths 37 and 38 in a manual shifting mode including upshift and downshift gear positions ("+" and "−"). Specifically, the shifter 30 includes a base 31 and a lever carrier 32 (FIG. 4) pivoted to inner casing 48 of the base 31 (FIG. 4) for movement about a first axis 33. The shift lever 34 is pivoted to the lever carrier 32 for movement about a second axis 35 perpendicular to the first axis 33. By this arrangement, the shift lever 34 can be selectively pivoted along the center or first path 36 (FIG. 3) or selectively moved into and pivoted along the parallel second and third paths 37 and 38 located on opposite sides of the first path 36. The symmetry of paths 37 and 38 allow the same shifter 30 to be used either in left-hand driven vehicles, such as those driven in the United States (see FIG. 1), or in right-hand driven vehicles, such as those driven in Europe (see FIG. 2). The only difference in such vehicles is a cover 39 (FIG. 1) or cover 39 (FIG. 2) attached to the base 31. The cover 39 includes a slot 40 shaped to limit movement of the shift lever 34 to the first shift path 36 and the second shift path 37, and the cover 39' includes a slot 40' shaped to limit movement of the shift lever 34 to the first shift path 36 and the third shift path 38.

The lever carrier 32 (FIG. 4) has parallel pairs of notches 41 for positions P, R, N, D, and L that correspond to the gear positions park, reverse, neutral, drive, and low drive, respectively. The shift lever 34 has a pawl 42 (FIG. 5) operably engaging the notches 41 to control movement of the shift lever 34 between the gear positions when the shift lever 34 is pivoted about the first axis 33 along the first path 36. A gated member 43 (FIG. 4) is pivoted by a pivot pin 76 to the base 31 for movement with the shift lever 34 when the shift lever 34 is pivoted along the first path 36. The gated member 43 has protrusions 84' that engage the shift lever 34 when the shift lever 34 is moved along the first path 36, as described in more detail below.

The gated member 43 includes a pawl-disengaging or "pawl driver" member 45 that releases the pawl 42 from the notches 41 when the shift lever 34 is pivoted into the second or third shift paths 37 and 38. The gated member 43 is configured to remain stationary when the shift lever 34 is pivoted into the second or third shift paths 37 and 38. Spring-biased plungers 89 and 90 on the gated member 43 are selectively engaged by the shift lever 34 only when the shift lever 34 is pivoted into the second or third shift paths 37 or 38 and when pivoted forwardly (for downshifting) or rearwardly (for upshifting). The spring-biased plungers 89 and 90 provide a feel when upshifting or downshifting in the manual shift mode of shift paths 37 or 38. This arrangement allows the shifter 30 to be used in either right-side driven or left-side driven vehicles. The right-handed cover 39 (FIG. 1) and the left-handed cover 39' (FIG. 2) can be selectively attached to the base 31, whereby the shift lever 34 is immediately configured for use in a left-side driven vehicle or a right-side driven vehicle, respectively, without further change. This greatly facilitates assembly and thus reduces manufacturing costs in a manufacturing plant where both United States and foreign vehicles are assembled, and also greatly helps in service where a vehicle is converted to another arrangement.

The illustrated base 31 includes box-shaped outer casing 47 (FIG. 1) defining a rectangular cavity, and an inner casing 48 (FIG. 4) that fits mateably into the outer casing 47. The outer casing 47 includes a quick connect 49 at one end shaped to mateably engage a sleeve anchor connector on a Bowden-type transmission cable assembly. Transmission cable assemblies are well-known in the art and their connection to base 31 and to shift lever 34 need not be described herein for an understanding of the present invention.

The inner casing 48 (FIG. 4) includes sidewalls 50 and 51 and end walls 52 and 53 shaped to fit closely into the outer casing 47. The end walls 52 and 53 also include holes 54 and 55, respectively, defining the first axis 33. The sidewalls 50 and 51 include aligned holes 56 for receiving the pivot pin 76 to pivotally mount the gated member 43 as described below. A mounting flange 58 is configured to support an electromechanical device, which is embodied in the illustrated arrangement as the solenoid 59. Attachment flanges 60 are provided on the walls 50–53 for receiving screws 61 to attach the inner casing 48 to the outer casing 47.

The shift lever carrier 32 includes a symmetrical molded body 62 with parallel sidewall portions 63 connected by end portions 64 and 65. Front and rear bearings 66 and 67 extend longitudinally from the tips of the end portions 64 and include cylindrically shaped bearing surfaces 68 configured to rotatably engage the holes 54 and 55. The bearing surfaces 68 include lubricant-carrying grooves 69 to promote long life. Parallel arches 70 and 71 extend from the tops of sidewall portions 63 and are rigidly interconnected by reinforcement ribs 72. The arches 70 and 71 each include an underside with the notches 41 defining the gear positions PRNDL.

The shift lever 34 (FIG. 5) includes a molded pivot-forming lever body 74 that fits closely between the sidewall portions 63, and a tubular lever post 75 secured to the lever body 74 that fits between the arches 70 and 71. The bottom end of the post 75 includes a ball connector 75' that is configured to engage a universal connector on a cable of the Bowden transmission cable assembly. This bottom ball connector 75' is known in the art and need not be further described. A pivot pin "Y" (FIG. 4) extends through the lever body 74 and rotatably through pivot holes 77 in a center of the sidewall portions 63 to pivotally mount the shift lever 34 to the lever carrier 32 for movement about the second axis 35. An elongated "straw" actuator 78 is positioned in the post 75, and the pawl 42 is attached to a lower end of the straw actuator 78. The pawl 42 extends laterally through opposing longitudinal slots in the post 75 to a location under the arches 70 and 71. The pawl 42 is biased upwardly, such as by a spring 78' under the pawl 42 within the post 75, such that the pawl 42 engages the notches 41. A handle (not specifically shown) is attached to a top of the post 75 and includes a thumb button operably connected to the straw actuator 78. This allows an operator to selectively move the pawl 42 to disengage the pawl 42 from specific notches 41. The notches 41 are configured to control movement between gear positions PRNDL. For example, the notches 41 allow the shift lever 34 to slide from R into N and on into D with the pawl 42 slidingly engaging the notches 41, but the notches 41 prevent the shift lever 34 from moving from N into R unless the pawl 42 is depressed. The notches 41 also prevent the shift lever 34 from moving from P to R unless the pawl 42 is depressed. It is noted that the general operation of the pawl 42 with the gear-position-defining notches PRNDL, and the general function and operation of the straw actuator 78 are known in the art, such that further explanation is not required for an understanding of the present invention.

Figure 4:
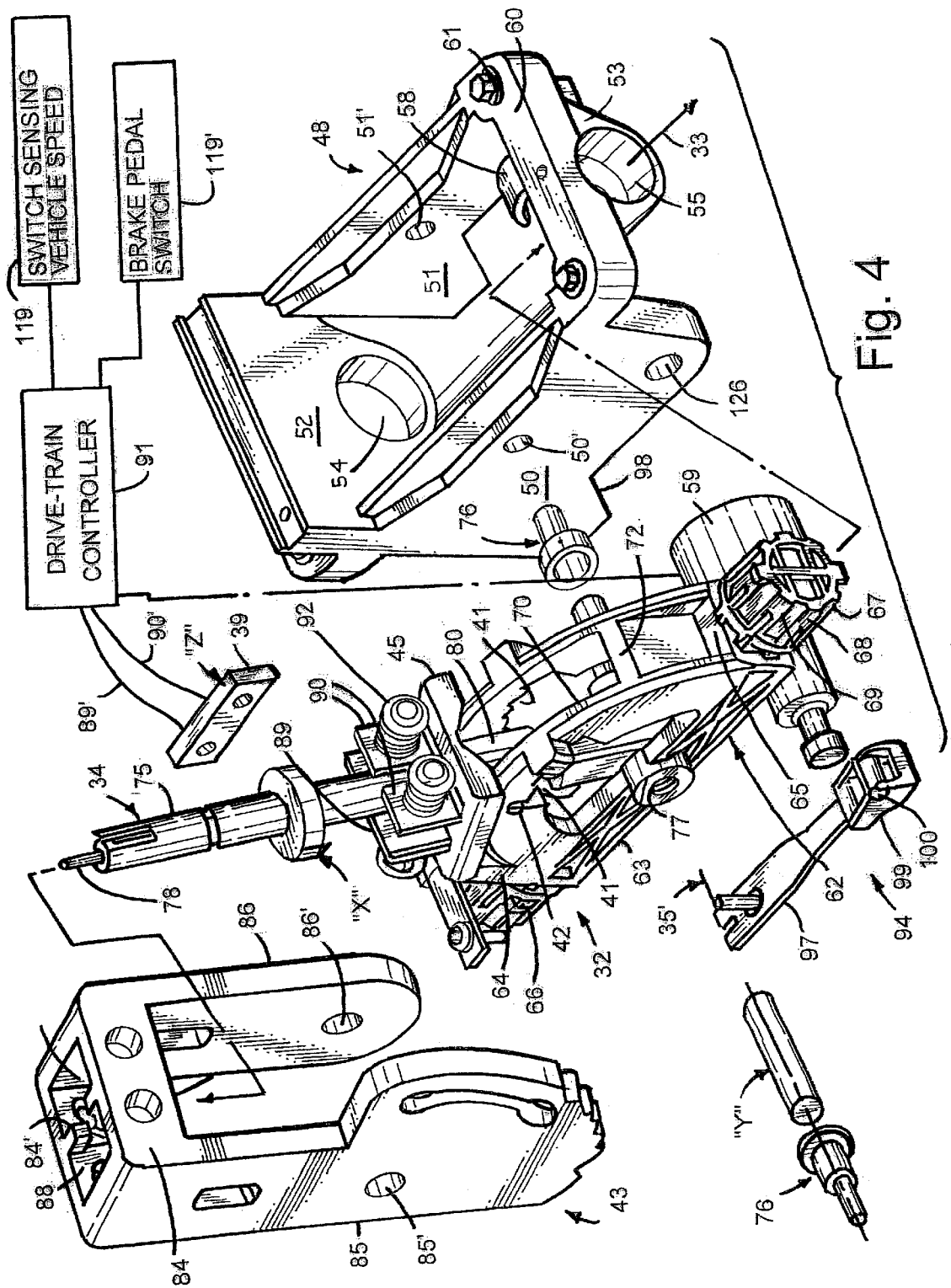
FIG. 4 is an exploded perspective view of the shifter shown in FIG. 3.
Figure 5:
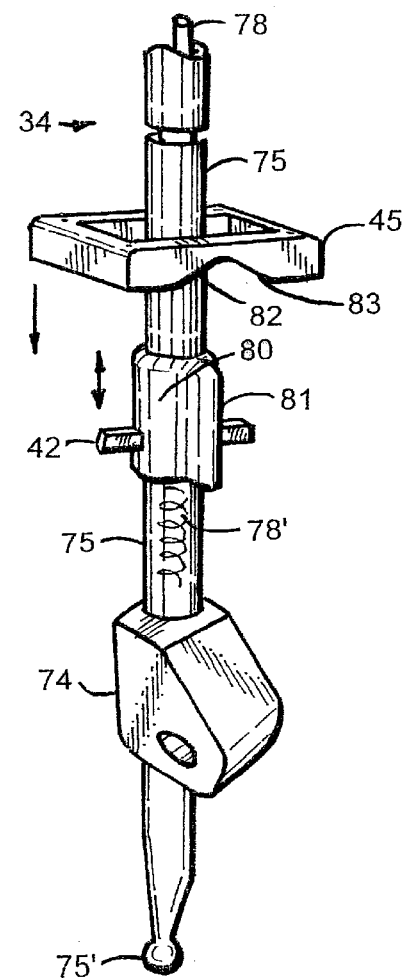
FIG. 5 is a perspective view of the shift lever shown in FIG. 4.
Figure 6:
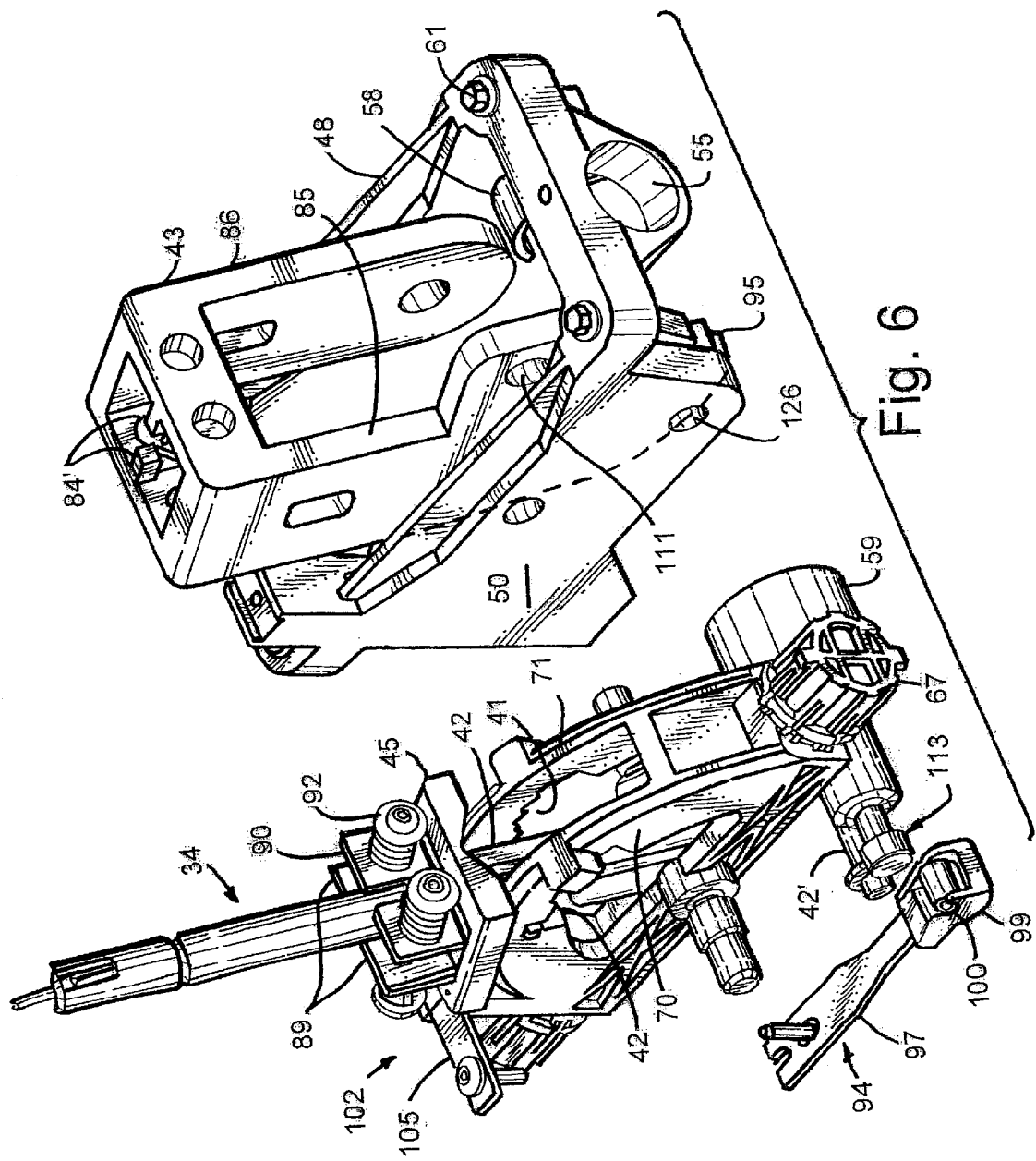
FIG. 6 is an exploded perspective view of the shifter shown in FIG. 3.

The gated member 43 (FIG. 4) has an inverted U shape, with a cross wall 84 and down walls 85 and 86. The down walls 85 and 86 include holes 85' and 86' that align with holes 50' in the sidewalls 50 and 51 of the inner casing 48. A pivot pin 76 extends through the holes 85', 86', 50', and 51' to pivotally secure the gated member 43 to the inner casing 48. The cross wall 84 of gated member 43 includes an enlarged rectangular aperture having opposing inwardly extending protrusions 84' so that the aperture defines an H-shaped cavity 88 (in top view), with the legs of the H-shaped cavity 88 being located in and extending parallel to the second and third shift paths 37 and 38. A spring plunger 89 is positioned in each forward end of the legs, and a second spring plunger 90 is positioned in each rearward end of the legs. The spring plungers 89 and 90 are positioned, such that movement of the lever and Hall effects magnet complete the circuit with the Hall effects switches "Z," completing the circuit through wires 89' and 90' to the controller 91. There are also springs 92 at each of the legs in the H-shaped cavity 88 to bias the shift lever 34 back toward a centered position after the switches "Z" are actuated and the shift lever 34 is released (i.e., after the manual upshift or manual downshift is completed). It is noted that switches "Z" are shown in FIG. 4 for illustrative purposes, but in reality they are mounted on the gated member 43.

A sleeve section 80 (FIG. 5) is slidably positioned on the post 75 and engages the pawl 42. The pawl driver 45 is rectangularly shaped to fit under the cross wall 84 (FIG. 4) and between down walls 85 and 86. The pawl driver 45 has a bottom with angled surfaces 82 and 83 shaped to engage ribs 81 and the sleeve section 80 as the shift lever 34 is pivoted from the first shift path 36 into either the second or third shift paths 37 or 38. This engagement causes the sleeve section 80 to move pawl 42 downwardly on the lever post 75 when the shift lever 34 is pivoted from the first shift path 36 to the second or third shift paths 37 or 38, disengaging the pawl 42 from the notches 41.

Figure 2:
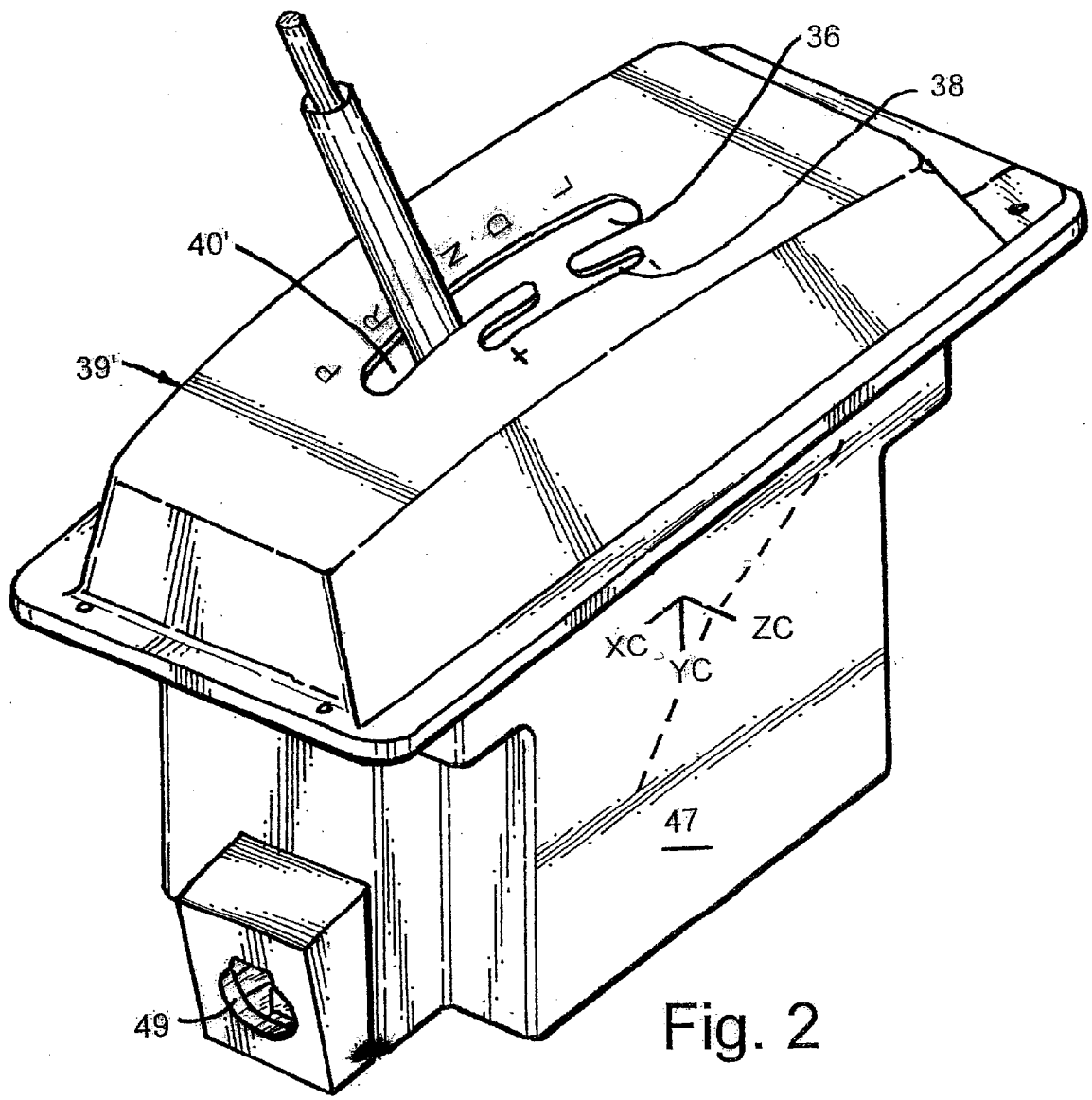
Figure 3:
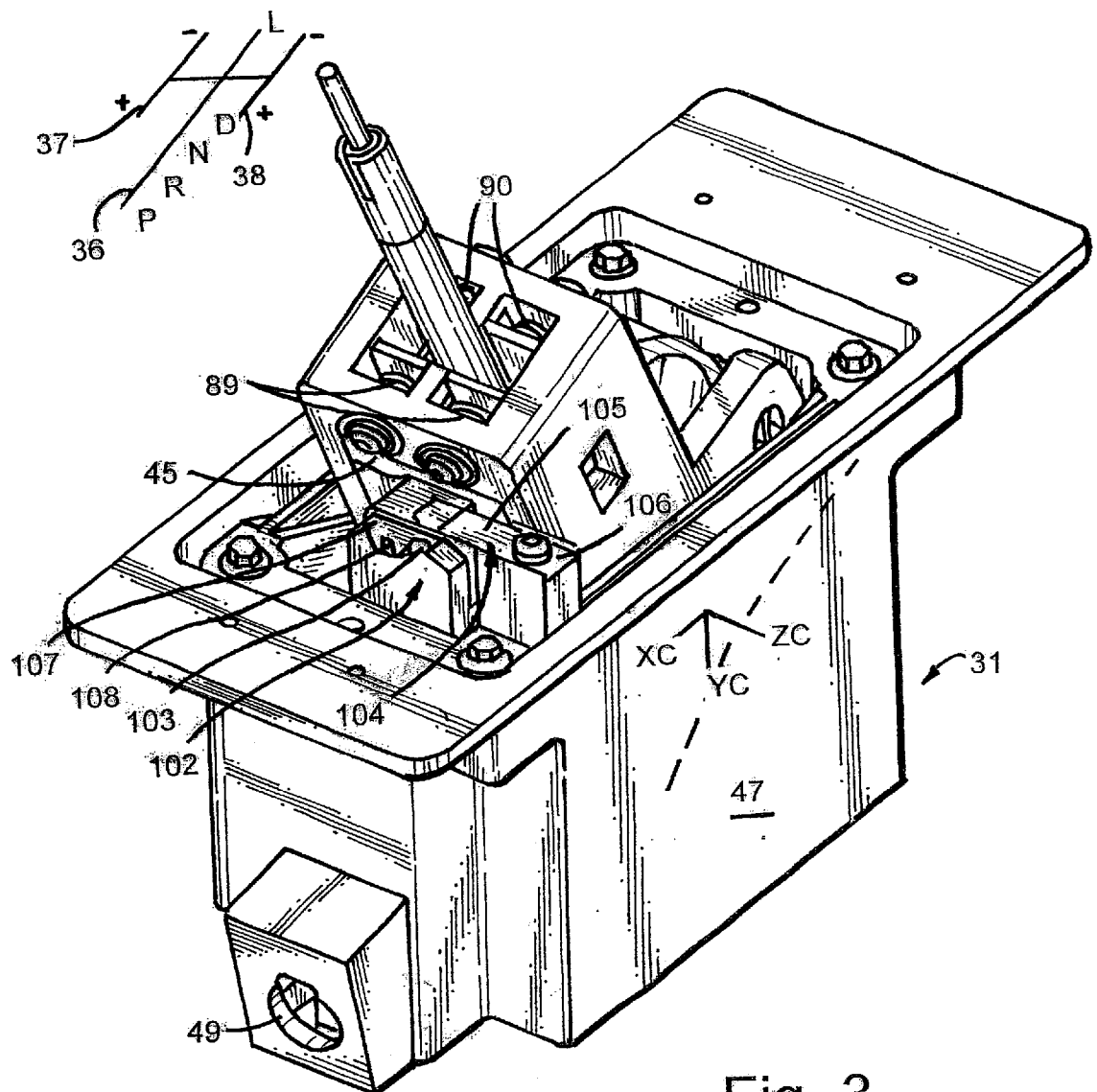
FIG. 3 is a perspective view of the shifter shown in FIGS. 1 and 2, but with the covers removed to show the symmetrical shifter therebelow.

Specifically, when the shift lever 34 is in the first shift path 36, it engages the ends of the protrusions 84', such that the gated member 43 moves along with the shift lever 34 as the shift lever 34 is pivoted between gear positions PRNDL along first shift path 36. When the shift lever 34 is in D and in the second or third shift paths 37 or 38, the pawl 42 is disengaged and also the gated member 43 is held in a stationary position by the feel positioner 94. Thus, when the shift lever 34 is moved along second or third shift paths 37 or 38, it engages one of the switches "Z." These switches "Z" are connected to a drive-train controller 91 (FIG. 4) on the vehicle. The controller 91 is configured to upshift or downshift the vehicle transmission in a manually shifted mode when the switches "Z," respectively, are sensed by the presence of magnet "X." For example, with the vehicle transmission in the D gear position (i.e., in third gear), a manual downshift would cause the controller to shift the transmission into the second gear. Since the second and third shift paths have identically wired switches "Z," the shifter 30 is symmetrical in the way that it operates. Thus, the same shifter can be used for either right-hand driven vehicles (i.e., the driver's seat is in a front right part of the vehicle) or left-hand driven vehicles (i.e., the driver's seat is in a front left part of the vehicle). The only difference is that the cover 39 has a slot 40 that limits the shifter 30 to be used in a right-hand driven vehicle, such as is commonly used in the United Kingdom (FIG. 1), or the cover 39' has a slot 40' that limits the shifter 30 to be used in a left-hand driven vehicle, such as is commonly used in Europe (FIG. 2).

Figure 7A:
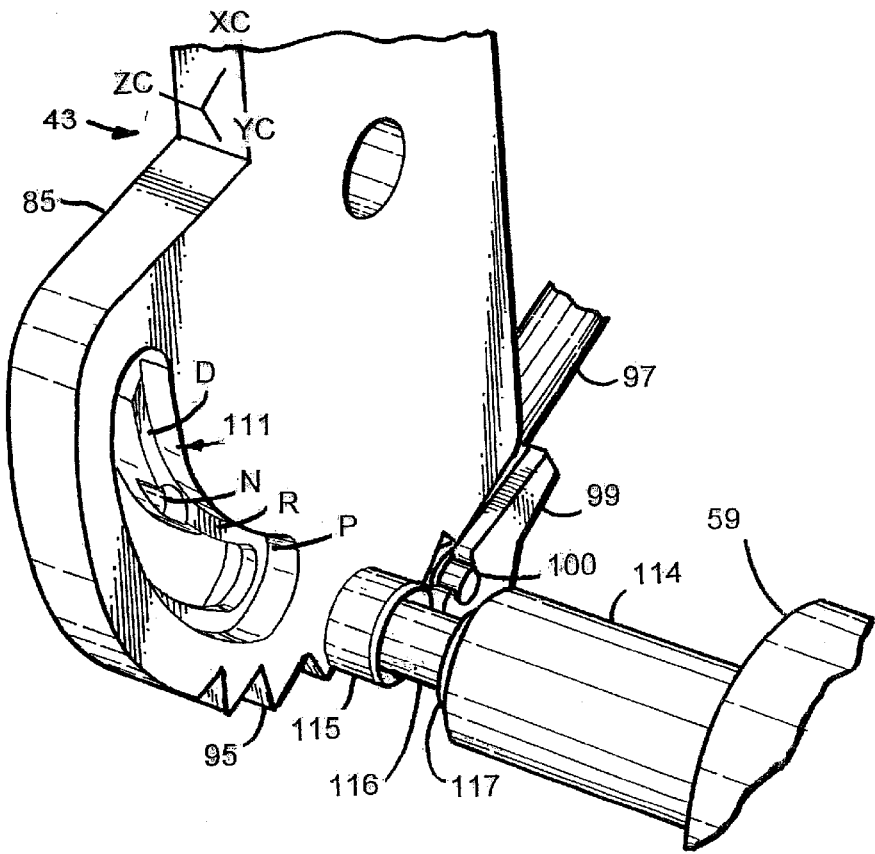
FIG. 7A is an enlarged fragmentary perspective view of the solenoid and the locking member of the shifter shown in FIG. 4.
Figure 7:
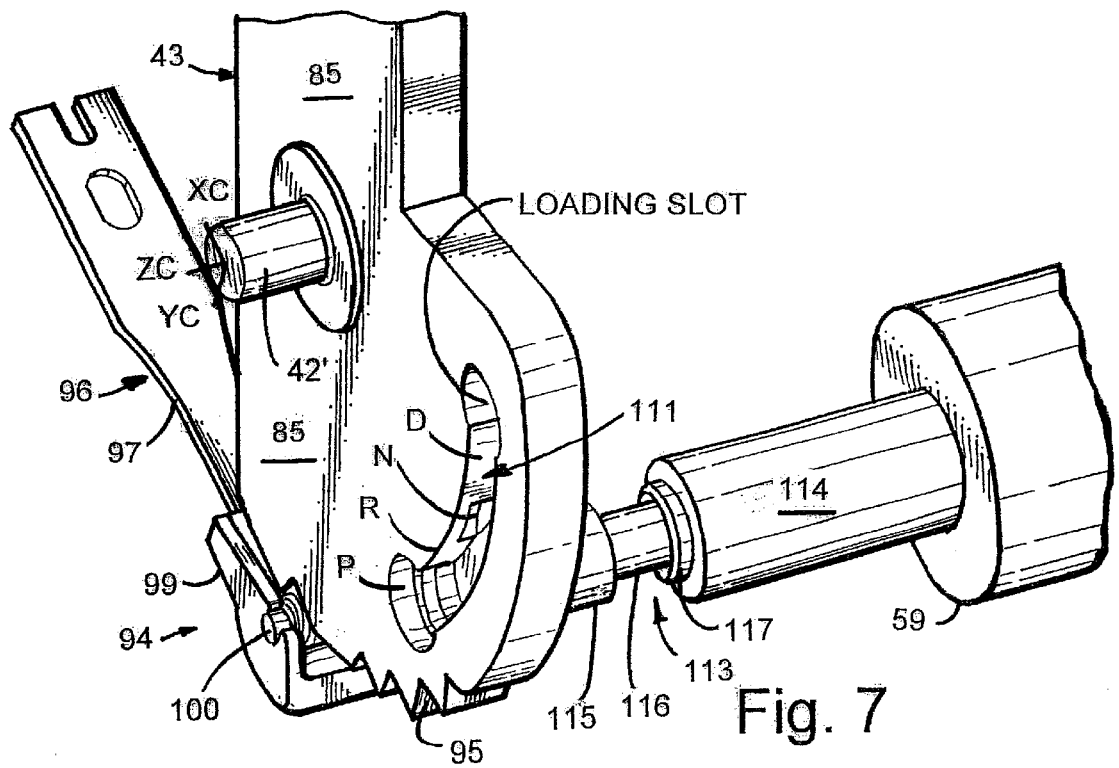
FIG. 7 is an enlarged fragmentary perspective view of the solenoid and the locking member of the shifter shown in FIG. 4.

A first feel positioner 94 (FIG. 7) provides a feel to a vehicle driver when pivoting the shift lever 34 about the second axis 35 between gear positions PRNDL. The feel positioner 94 includes an undulated or irregular surface 95 on a bottom of the down wall 85, with the bumps of the irregular surface 95 corresponding to the gear positions PRNDL. The feel positioner 94 further includes a cantilevered arm 96 having a leaf spring 97 attached to a mount 98 (FIG. 4) on the inner casing 48 of the base 31, and a molded hand 99 holding a roller 100. The roller 100 is biased by the leaf spring 97 into frictional rolling engagement with the irregular surface 95, and provides different resistance to rotational movement as the shift lever 34 is pivoted between the gear positions PRNDL.

A second feel positioner 102 (FIG. 3) provides a feel to a vehicle driver when moving the shift lever 34 laterally from the automatically shifted mode (i.e., from the first shift path 36) to the manually shifted modes (i.e., to either of the second or third shift paths 37 and 38). The feel positioner 102 includes an undulated or irregular surface 103 on a top of the lever carrier 32 near the front bearing 66, with the hollows between the bumps of the irregular surface 103 corresponding to the first, second, and third shift paths 36–38. The feel positioner 102 further includes a cantilevered arm 104 having a leaf spring 105 attached transversely to a mount 106 on the inner casing 48 of the base 31, and a molded hand 107 holding a roller 108. The roller 108 is biased by the leaf spring 105 into frictional rolling engagement with the irregular surface 103, and provides different resistance to rotational movement as the shift lever 34 is pivoted between the shift paths 36–38. The feel positioners 94 and 102 are configured to bias the shift lever 34 and the lever carrier 32 to a center of their respective selected positions.

A lock device holds the gated member 43 in a stationary position when the shift lever 34 is moved to the second or third shift paths 37 or 38 by engagement of projection 203 and 202 on lever carrier 32 into slots 200 and 201.

Figure 20:
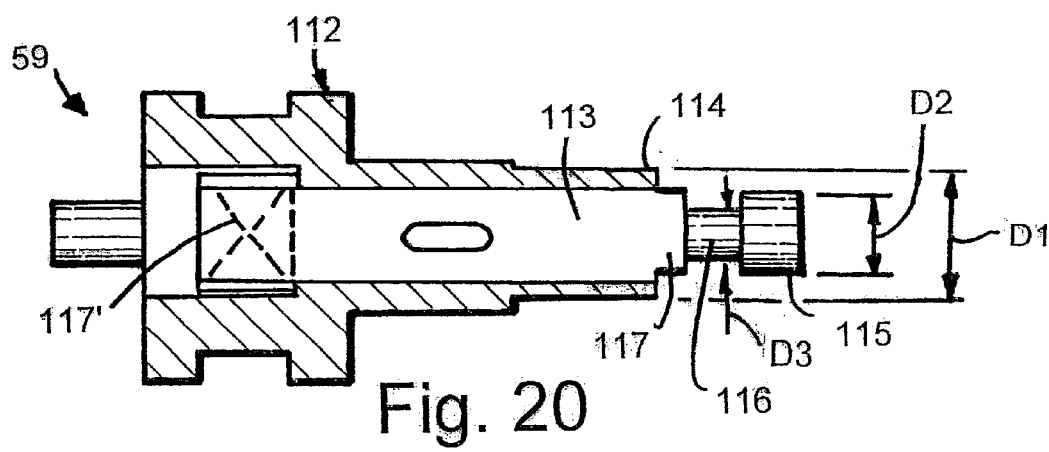
FIG. 20 is a cross-sectional view showing the internal details of the solenoid shown in FIG. 9.
Figure 21:
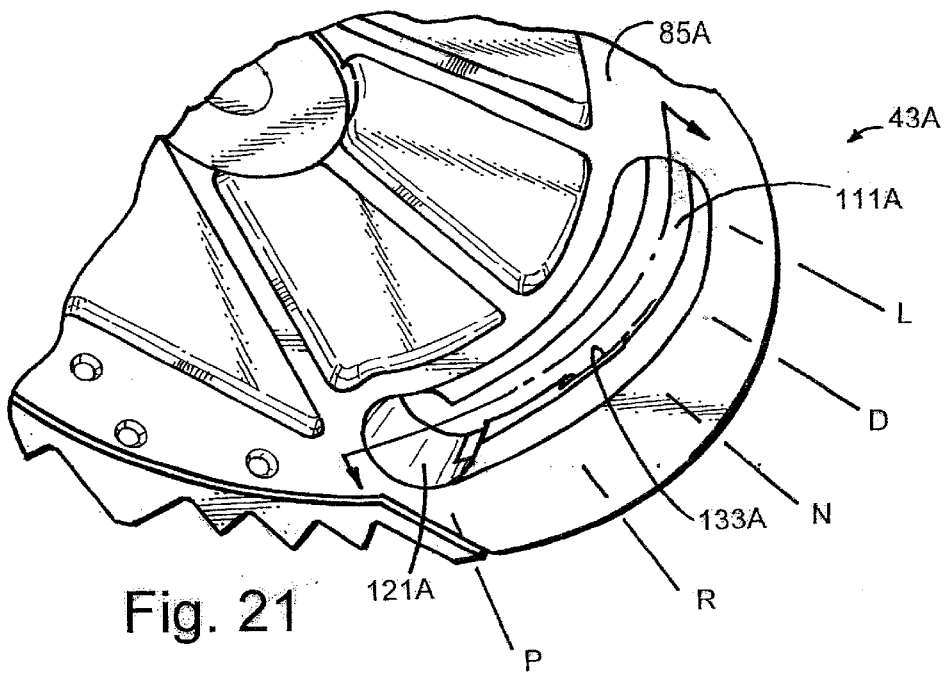
FIG. 21 is a fragmentary perspective view of the "down wall 85A" of a modified shifter, the view being similar to FIG. 7.

A unique park lock and reverse lockout device 110 (FIG. 8) is provided by the solenoid 59 that is attached to the inner casing 48 of the base 31, and its engagement with a configured slot 111 in the down wall 85 of gated member 43. The slot 111 extends arcuately around the pivot hole 85'. The solenoid 59 (FIG. 20) includes a body 112 and an extendable pin 113. The extendable pin 113 (FIG. 9) telescopingly engages a shaft-covering sleeve 114. The sleeve 114 has a first outer diameter D1. The pin 113 has outer, middle, and inner sections 115–117, respectively, that extend from its outer tip inwardly with outer diameters of D2, D3 and D2 respectively. The diameter D3 of middle section 116 is smaller than the diameter D2 of outer and inner sections 115 and 117, and the middle section 116 is located between outer and inner sections 115 and 117 for reasons given below. The illustrated extendable pin 113 is spring-biased to a normally retracted position, but is extendable 7-mm (FIGS. 9 and 10). The sections 115–117 have lengths of 7 -mm, 8 -mm, and 3 -mm, respectively, when retracted. (The length of the inner section 117 becomes 10 -mm when the pin 113 is extended, since the pin 113 is extended 7 mm.) A spring 117' biases the pin 113 to a normally retracted position.

Figure 11:
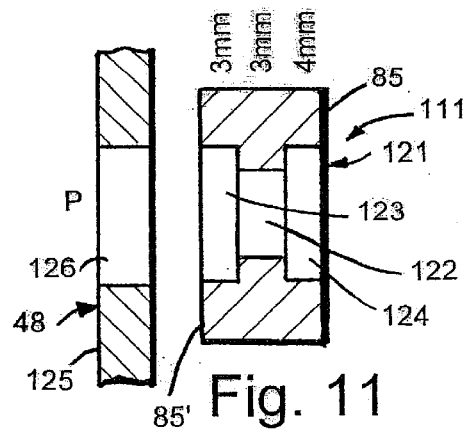
FIGS. 11–14 are cross-sectional views taken transversely across the configured slot in the gated member at the park, reverse, neutral, and drive positions in the slot.
Figure 12:
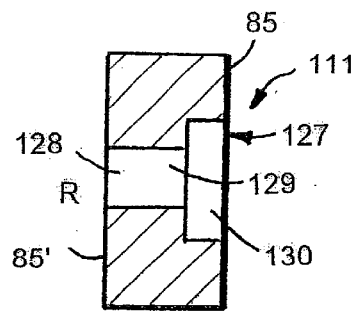
Figure 13:
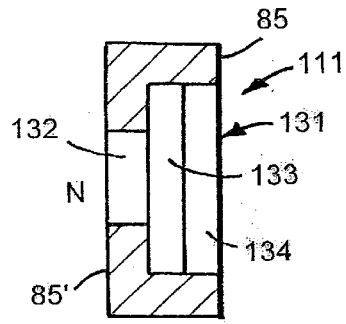
Figure 14:
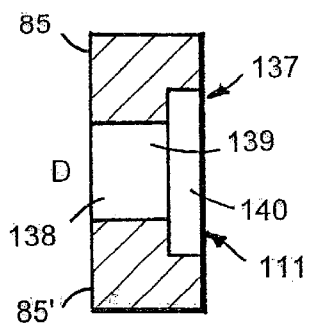
Figure 18:
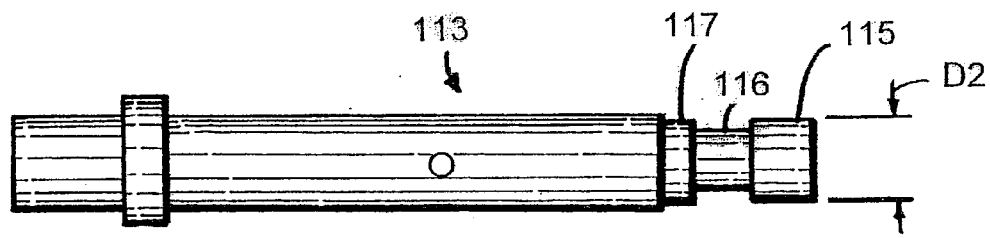
FIGS. 18 and 19 are side views of the extendable pin and the housing of the solenoid shown in FIG. 9.
Figure 19:
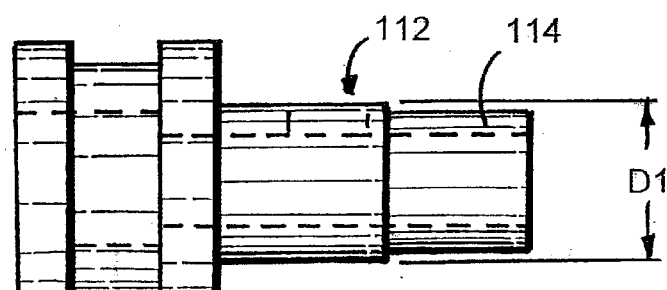

The configured slot 111 (FIG. 8) has a first end with a hole 120 large enough for the inner section 115 of the extendable pin 113 to fit through in order to permit assembly. The part of the slot 111 that corresponds to the P gear position (FIG. 11) includes a three-sectioned "park" defining surface 121 (FIG. 11) having a middle section 122 with a small diameter D3 and outer and inner face sections 123 and 124 having the larger diameter D2. The inner casing 48 also has a wall section 125 with a hole 126 having a diameter D2 that aligns with the extendable pin 113. The part of the slot 111 that corresponds to the R gear position includes a three-sectioned "reverse" defining surface 127, where the outer and middle two sections 128 and 129 have the smaller diameter D3, and the inner section 130 has the larger diameter D2. The part of the slot 111 that corresponds to the N position includes a three-sectioned "neutral" defining surface 131, where the outer section 132 has the smaller diameter D3, but the middle and inner sections 133 and 134 have the larger diameter D2. The part of the slot 111 that corresponds to the D position is like the width 127 at the R position of the slot 111, and includes a three-sectioned "drive" defining surface 137, where the outer and middle sections 138 and 139 have the smaller diameter D3, and the inner section 140 has the larger diameter D2. To summarize, the inner sections 124, 130, 134, and 140 are all the same size D2, while the outer and middle sections differ in size to provide particular functions, as described below.

Figure 16:
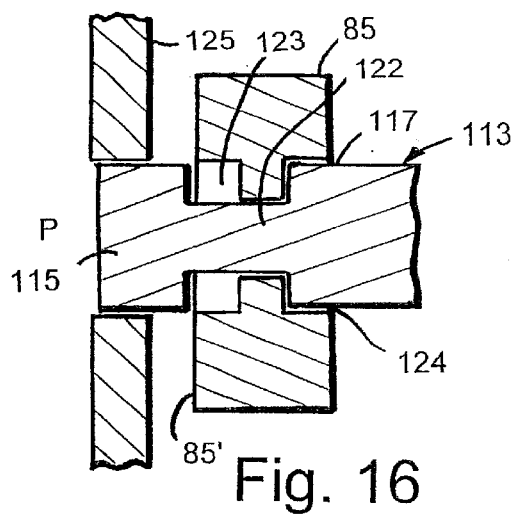
FIGS. 15 and 16 are cross-sectional views similar to the FIG. 11, but showing the extendable pin in the solenoid as being in the retracted and extended positions, respectively.
Figure 15:
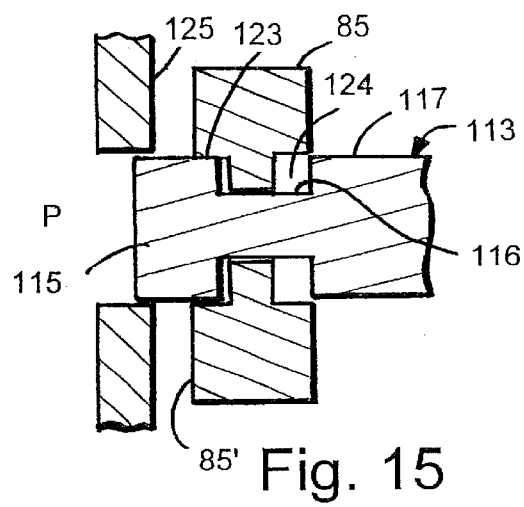
Figure 17:
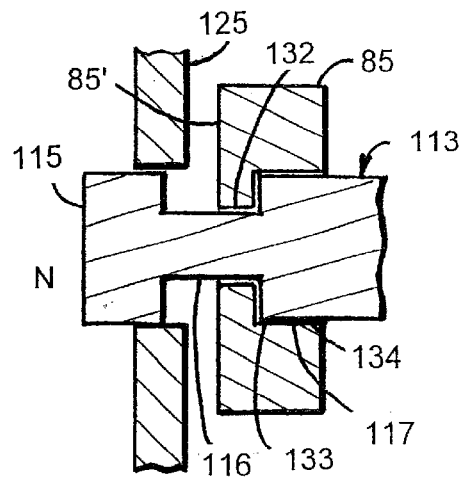
FIG. 17 is a cross-sectional view similar to the FIG. 13, but showing the extendable pin of the solenoid as being in the extended position.

In its extended and retracted positions, the outer section 115 of pin 113 always engages the hole 126 in the wall section 125 of inner casing 48 (see FIGS. 15 and 16). The continuous engagement of the outer section 115 with the hole 126 keeps the pin 113 in proper alignment at all times, despite stress and transverse forces applied to the pin 113, such as from an operator trying to move the shift lever 34 without properly releasing the shift lever 34 from a locked position.

When the ignition key is off or removed, the solenoid 59 is de-energized and the extendable pin 113 is retracted (FIG. 15). When the ignition key is inserted and the vehicle ignition turned on, the solenoid 59 remains de-energized and retracted. When pin 113 is retracted and the shift lever 34 is in the P gear position (FIG. 15), the outer section 115 of the pin 113 nests into and engages the outer section 123 of park-defining surface 121 that the shift lever 34 of the vehicle is in a park locked position where the shift lever 34 cannot be moved out of the P gear position.

When the vehicle ignition key is in the "on" position and the driver presses on the park brake pedal, the controller 91 is programmed to energize the solenoid 59, causing the pin 113 to extend (FIG. 16). When extended, the small-diameter middle section 116 of the pin 113 is positioned in line with the small diameter middle section 122 of the park-defining surface 121, such that the gated member 43 is unlocked from the park lock position so that it (and the shift lever 34) can be pivoted. This allows the pin 113 to slide along the slot 111 from the P gear position to the R gear position. After the pin 113 exits the P gear position, the pin 113 is de-energized and the pin 113 retracted so that the configured slot 111 and pin 113 allow the gated member 43 to be further pivoted to the N or D gear positions (i.e., the pin 113 must be de-energized so that the end 115 of pin 113 does not engage the enlarged middle section 133 of the neutral-defining surface 131 of the slot 111). The controller 91 includes a timer (e.g., set to expire in less than 2 seconds) or is programmed to sense that the shift lever 34 is out of the P gear position. For example, Hall effect sensors can be positioned on the cover 39 and connected to controller 91 to sensor a location of the shift lever 34 as it exits the P gear position. The controller 91, when the shift lever 34 exits and is no longer in the P gear position, de-energizes the solenoid 59, such that the pin 113 retracts.

The pin 113 (in the retracted position) and the slot 111 allow the gated member 43 to be pivoted from the D gear position back to the P gear position at any time (as long as the solenoid 59 remains de-energized and the pin 113 remains biased toward its retracted position) since the outer end section 115 of pin 113 slides along surface 85'. When the pin 113 is retracted and the shift lever 34 is moved back to the P gear position, the outer section 115 telescopes into and lockingly engages the outer section 123 of park-defining surface 121, thus locking the shift lever 34 in the park lock position (i.e., with the brake pedal not depressed).

The controller 91 is also attached to a switch 119 for sensing vehicle speed and a brake pedal switch 119' to sense when the brake pedal is depressed and the brakes applied. If the vehicle speed is too high, such as above 3 mph, the controller 91 energizes the solenoid 59 to extend the pin 113. In the extended position, the inner section 117 of pin 113 telescopingly extends into middle section 133 in hole 131, such that it locks the shift lever 34 in the N gear position and prevents the shift lever 34 from being shifted from the N gear position toward the R or D gear position. Notably, the driver can shift the shift lever 34 from the D gear position to the N gear position, but cannot move the shift lever 34 from the N gear position into the R or D gear position until the brake pedal is pressed, closing the brake pedal switch 119'. Thus, this provides a neutral lock function. This causes the pin 113 to hold the gated member 43 and hence the shift lever 34 in the N gear position until the pin 113 is retracted (i.e., until the brake is applied).

When the shift lever is in the N gear position, the controller 91 only de-energizes the solenoid 59 to cause the pin 113 to retract when the brake pedal is depressed and the brake pedal switch 119' is closed. Notably, the action of depressing the brake pedal and operating the brake pedal switch 119' in this circumstance causes the solenoid 59 to de-energize, which is opposite the action that occurs when in the P gear position. This arrangement advantageously provides a neutral lock feature, with the same solenoid 59 being used for both park lock and neutral lock features. This is a tremendous cost savings since it allows a single solenoid to provide both a park lock function and a neutral lock function. Contrastingly, if a second solenoid or a second cable was required, it would add up to five dollars ($5) or more per assembly to the cost of manufacture. It is contemplated that the present inventive arrangement can be used in any shifter where it is desirable to include a park lock feature and a neutral lock feature. Restated, this concept is not believed to be limited only to shifters having an automatic shifting mode (i.e., PRNDL) and a manually shifting mode (i.e., upshift and downshift), as in the present shifter 30.

In the second and third shift paths 37 and 38, the slot 40 in the cover 39 (or the slot 40' in the cover 39') forces the shift lever 34 to remain in the detented D gear position. Thus, there does not need to be any park lock or reverse lockout when the shift lever 34 is in the second or third shift paths because the slot 40 (or slot 40') prevents the shift lever 34 from being moved to the P gear position.

Modification

A modified shifter incorporating a modified gated member 43A is shown in FIGS. 21–28. The modified gated member 43A is similar to the gated member 43 and, as will be understood by a person skilled in the art, can be substituted for gated member 43, as described below. Accordingly, it is not necessary in this document to describe the shifter 30 (e.g. the base 31, the lever carrier 32, the shift lever 34, and a majority of the gated member 43) a second time for a person skilled in the present art to understand this modification. To simplify the present description, in modified gated member 43A, all similar or identical components are identified with the same identification number but with the addition of the letter "A". This is done to reduce redundant discussion and not for another purpose.

In the present modification, the down wall 85A of gated member 43A and the extendable pin 113A are modified as follows. Briefly summarized, the assembly hole 120 is eliminated in the configured slot 111A in the down wall 85A, and an elongated guide 160A formed along the sidewalls forming the slot 111A. The guide 161A is modified to include an inclined ramped surface 160A between the park position P and the neutral position N. Also, the park defining surface or hole 121A is modified to become a continuous hole with a single bore diameter. The extendable pin 113A continues to include outer, middle, and inner sections 115A–117A, respectively, for selectively and controllably engaging the park and neutral notches. The result is an arrangement that is better adapted to function with the extendable pin 113A, and yet provide long term durability and to facility assembly, as described below.

Figure 22:
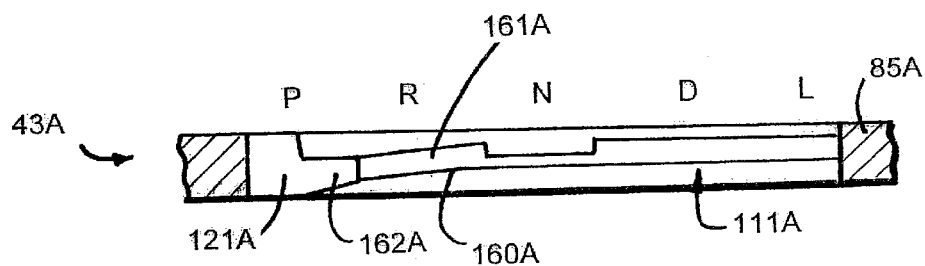
FIG. 22 is a schematic cross-sectional view taken along the line XXII—XXII in FIG. 21.
Figure 23:
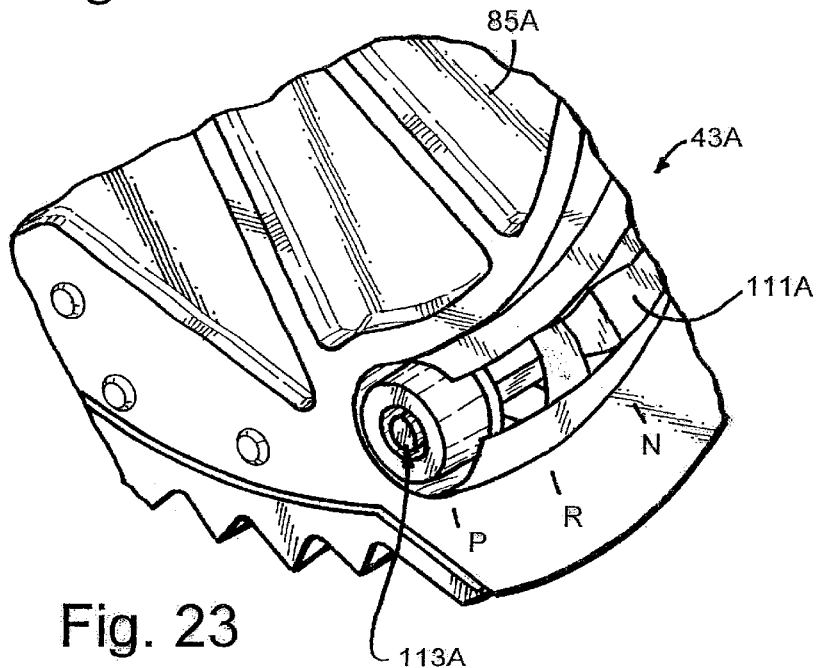
FIGS. 23 and 23A are fragmentary perspective views of the modified shifter of FIG. 21, but including the extendable pin 113A of the solenoid operated locking device, FIGS. 23 and 23A being of opposite sides, similar to FIGS. 8 and 7A respectively.
Figure 21A:
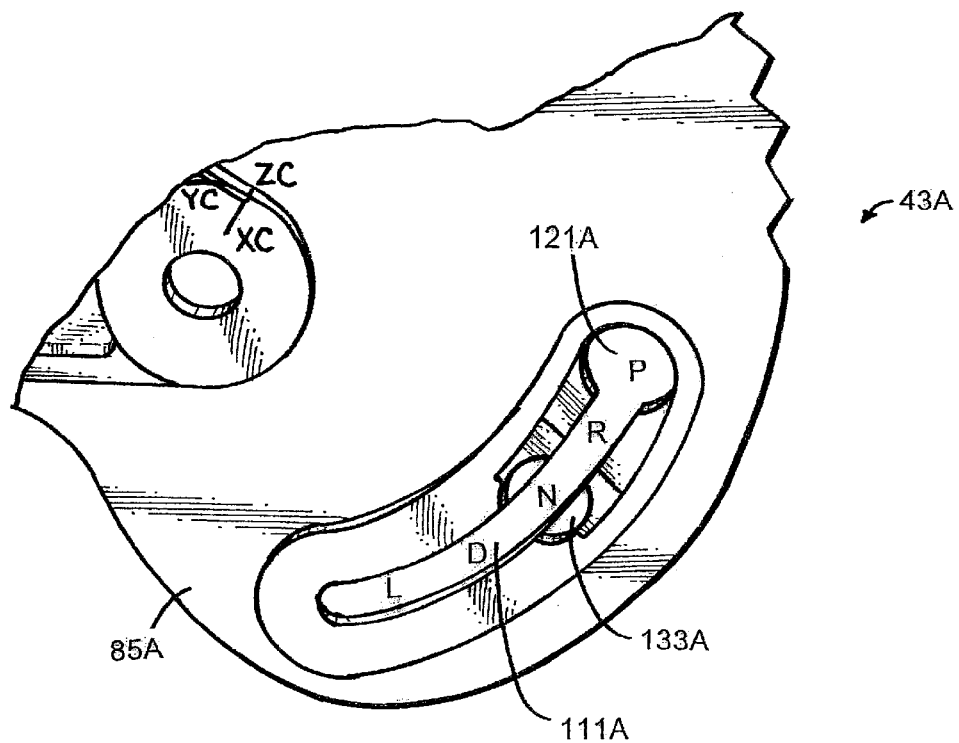
FIG. 21A is a fragmentary perspective view of the shifter of FIG. 21, but of an opposite side and similar to FIG. 7A.
Figure 23A:
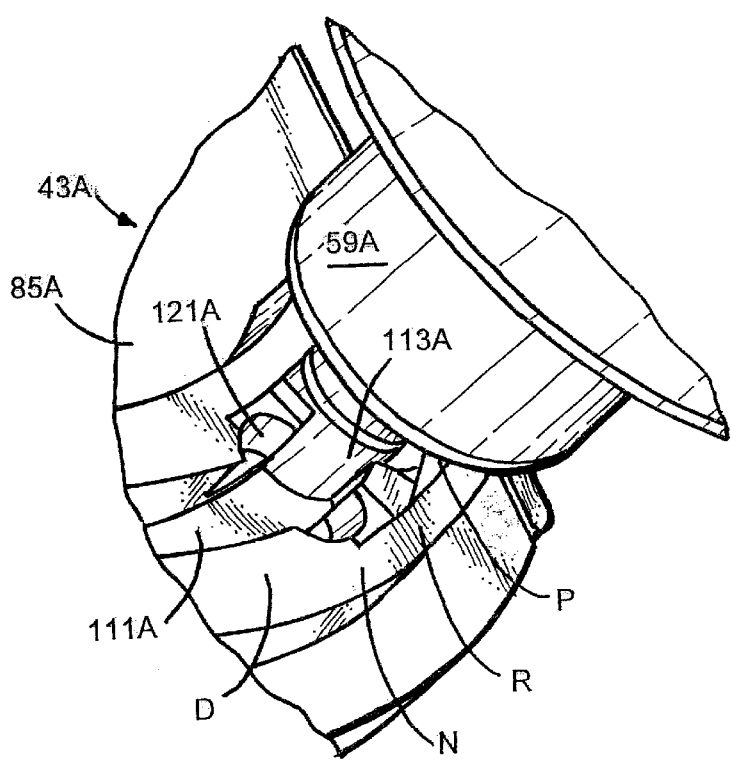

More specifically, with the shift lever in the park position and the vehicle brake pedal not depressed (FIG. 24), the controller 91 de-energizes the solenoid 59A, and the solenoid 59A spring-biases the extendable pin 113A to a normally-retracted position. This places the outer section 115A in the park hole 121A, with the outer section 115A fully positioned in the park hole 121A. The outer section 115A slidably engages both the park hole 121A, and also engages the hole 126A in the wall section 125A of the casing (48) for added stability. When the solenoid 59A is energized, such as when the vehicle park brake is depressed, the pin 113A is extended (FIG. 25). This positions the middle section 116A of the end of the pin 113A in alignment with an end 162A of the elongated guide 161A (FIG. 22). Thus, a vehicle driver is allowed to move the shift lever 34 out of the park position P into the reverse position R (FIG. 26). As the shift lever 34 exits the park position P (e.g. when the shift lever 34 is one or two degrees out of the park position), the solenoid 59 is de-energized. This causes the pin 113A to retract, with the outer end section 115A engaging the ramped surface 160A. As the shift lever 34 is moved to the neutral position N (FIG. 27), the extendable pin 113A is further retracted due to the inclination of the ramped surface 160A. The engagement of the inner end section 117A with the guide 160A positively moves the pin 113A closer to a fully retracted position. This is an advantage because the solenoid 59 extends the pin 113A with a more positive and forceful action when the pin 113A is closer to a fully retracted position than when the pin 113A is closer to a fully extended position. Thus, when the shift lever 34 is in the neutral position N and the solenoid 59A is energized (FIG. 28), the solenoid 59A provides a positive force to extend the pin 113A, with the inner end section 116A engaging the neutral notch 133A. It is noted that when the solenoid 59A is de-energized (i.e. the pin 113A retracted), the shift lever 34 can be moved from the neutral position N through the reverse position R to the park position P due to the inclination of ramped surface 160A and the sliding engagement of the outer end section 115A with the guide 161A.

It is contemplated that the controller 91 can be programmed to react to different vehicle conditions, as required by a vehicle manufacturer, before energizing or de-energizing the solenoid 59. In particular, there are different vehicle conditions that vehicle manufacturers may want before a shift lever 34 is locked in neutral. One vehicle condition is where a vehicle operator has stopped a vehicle, shifted into neutral, and applied the vehicle manual park brake with the vehicle motor still running. (This apparently sometimes happens in Europe, where manual transmissions are still very popular, even though the vehicle being driven has an automatic transmission.) In this circumstance, it would be undesirable for the shift lever to be accidentally bumped from neutral into drive (or reverse) positions. At least one vehicle manufacturer has been interested in programming the vehicle controller to energize the solenoid 59 and lock the shift lever 34 in the neutral position after the shift lever 34 has been in the neutral position N for a predetermined time period, such as about 15 to 20 seconds.

In the foregoing description, persons skilled in the art will recognize that modifications may be made to the invention without departing from the concepts disclosed herein. Such modifications are to be considered as included in the following claims, unless these claims by their language expressly state otherwise.

The invention claimed is:

1. A shifter for shifting a transmission between different gear positions including a plurality of different gear positions, comprising:

a base;

a shift lever pivoted to the base for movement between shift lever positions corresponding to the different gear positions, the shift lever including a flange with an elongated slot with a first enlarged pocket corresponding to a first one of the different gear positions and a second enlarged pocket corresponding to a second one of the different gear positions;

a control circuit adapted to sense at least one vehicle condition; and an electromechanical device having an extendable pin that is continuously positioned in the slot in all positions of the shift lever, the extendable pin being configured to engage the first enlarged pocket and lock the shift lever in the first one gear position until first predetermined vehicle conditions are met, the extendable pin being configured to engage the second enlarged pocket and lock the shift lever in the second one gear position until second predetermined vehicle conditions are met.

2. The shifter defined in claim 1, wherein the extendable pin includes a shaft and an enlarged end section, and the slot further includes an enlarged hole at one end permitting the enlarged end section of the pin to be extended through the enlarged hole for assembly.

3. The shifter defined in claim 1, wherein the control circuit is configured to extend the pin of the solenoid to lock the shift lever in a neutral shift lever position, which neutral shift lever position corresponds to the first one gear position, and to retract the pin of the solenoid to lock the shift lever in a park shift lever position, which park shift lever position corresponds to the second one gear position.

4. The shifter defined in claim 1, wherein the first and second enlarged pockets extend only partially into the flange.

5. The shift lever defined in claim 1, wherein the first and second enlarged pockets include portions that extend into opposite sides of the flange.

6. The shift lever defined in claim 1, wherein the electromechanical device includes a solenoid, and wherein the base includes a wall having a supporting hole that aligns with the extendable pin for receiving and supporting an end section of the pin on a side of the flange opposite the solenoid.

7. A shifter for shifting a transmission between different gear positions including park, reverse, neutral, and drive gear positions, comprising:

a base;

a shift lever pivoted to the base for movement between shift lever positions corresponding to the different gear positions, the shift lever including a flange with an elongated slot with an enlarged neutral pocket;

a control circuit adapted to sense at least one vehicle condition; and an electromechanical device having an extendable pin that is continuously positioned in the slot in all positions of the shift lever, the extendable pin being configured to engage the neutral pocket and lock the shift lever in the neutral shift lever position until first predetermined vehicle conditions are met.

* * * * *